(12) United States Patent
Liong (10) Patent No.: US 11,838,887 B2
(45) Date of Patent: Dec. 5, 2023

(54) COMMUNICATION METHOD OF NETWORK ENTITY AND RELATED WIRELESS COMMUNICATION SYSTEM

(71) Applicant: Wistron Corporation, New Taipei (TW)

(72) Inventor: Jian Wah Liong, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 17/145,384

(22) Filed: Jan. 10, 2021

(65) Prior Publication Data
US 2022/0150862 A1 May 12, 2022

(30) Foreign Application Priority Data
Nov. 10, 2020 (TW) .................... 109139158

(51) Int. Cl.
*H04W 60/04* (2009.01)
*H04W 76/10* (2018.01)
(Continued)

(52) U.S. Cl.
CPC .......... *H04W 60/04* (2013.01); *H04W 48/02* (2013.01); *H04W 68/005* (2013.01); *H04W 76/10* (2018.02); *H04W 88/06* (2013.01)

(58) Field of Classification Search
CPC . H04W 52/0216; H04W 48/16; H04W 76/25; H04W 76/28; H04W 8/08; H04W 24/02; H04W 28/0221; H04W 28/065; H04W 48/18; H04W 52/0209; H04W 52/0212; H04W 52/0219; H04W 52/0229; H04W 52/028; H04W 60/005; H04W 64/00; H04W 68/02; H04W 72/042; H04W 76/10; H04W 76/19; H04W 76/20; H04W 76/27; H04W 76/30; H04W 76/38;
(Continued)

(56) References Cited

U.S. PATENT DOCUMENTS 11,109,222 B2 * 8/2021 Wang ................ H04W 8/02
2016/0262041 A1 * 9/2016 Ronneke .......... H04W 28/0221
(Continued)

FOREIGN PATENT DOCUMENTS

CN 109041121 A * 12/2018 ............ H04W 76/20
CN 110300419 A * 10/2019
(Continued)

OTHER PUBLICATIONS

3GPP TR23.724, v16.1.0, Jun. 2019, Technical Specification Group Services and System Aspects; Study on Cellular Internet of Things (CIoT) support and evolution for the 5G System (5GS) Release 16 pp. 90-96 (Year: 2019).*

(Continued)

*Primary Examiner* — Matthew C Sams
(74) *Attorney, Agent, or Firm* — Winston Hsu (57) ABSTRACT

A communication method of a network entity for a network equipment includes the steps of: receiving a request message of entering a mobile initiated connection only (MICO) mode from a user equipment (UE); determining a time length of a delay timer of the MICO mode according to the request message; and paging the UE when the delay timer of the MICO expires.

13 Claims, 5 Drawing Sheets

(51) Int. Cl.
*H04W 48/02* (2009.01)
*H04W 68/00* (2009.01)
*H04W 88/06* (2009.01)

(58) Field of Classification Search
CPC ........ H04W 8/20; H04W 88/06; H04L 47/14; H04L 49/90
See application file for complete search history.

(56) References Cited

U.S. PATENT DOCUMENTS

| | | | |
|---|---|---|---|
| 2018/0227872 A1* | 8/2018 | Li | H04W 8/02 |
| 2018/0338281 A1* | 11/2018 | Bangolae | H04W 68/02 |
| 2019/0364541 A1 | 11/2019 | Ryu | |
| 2020/0100088 A1* | 3/2020 | Kim | H04W 48/16 |
| 2020/0236534 A1* | 7/2020 | Wang | H04W 8/22 |
| 2020/0260384 A1* | 8/2020 | Ryu | H04W 52/0261 |
| 2021/0168901 A1* | 6/2021 | Kim | H04W 76/25 |
| 2023/0016327 A1* | 1/2023 | Long | H04W 76/28 |

FOREIGN PATENT DOCUMENTS

| | | | | |
|---|---|---|---|---|
| CN | 113079553 A | * | 7/2021 | |
| CN | 114205896 A | * | 3/2022 | |
| WO | WO-2016148752 A1 | * | 9/2016 | ............. H04W 8/20 |
| WO | WO-2016182530 A1 | * | 11/2016 | ........ H04W 52/0216 |
| WO | 2019/139903 A1 | | 7/2019 | |
| WO | WO-2019139903 A1 | * | 7/2019 | ............ H04W 76/19 |
| WO | WO-2020001450 A1 | * | 1/2020 | |
| WO | WO-2020147972 A1 | * | 7/2020 | .......... H04W 52/028 |
| WO | WO-2021104699 A1 | * | 6/2021 | ........ H04W 52/0216 |

OTHER PUBLICATIONS

Tencent, "Mico mode and Periodic Registration Timer Control", Change Request, SA WG2 Meeting #133, May 13-17, 2019, S2-1906045, 4 pages. (Year: 2019).*

3GPP, ETSI TS 124 501 V15.1.0 (Oct. 2018), 5G; Non-Access-Stratum (NAS) protocol for 5G System (5GS); Stage 3 (3GPP TS 24.501 version 15.1.0 Release 15), pp. 1-405, Oct. 2018.

* cited by examiner

| Bit 8 | Bit 7 | Bit 6 | Bit 5 | Bit 4 | Bit 3 | Bit 2 | Bit 1 |
|---|---|---|---|---|---|---|---|
| MICO indication information elements | | | | Spare information element | Spare information element | SPRTI | RAAI |

FIG. 3

| Bit 8 | Bit 7 | Bit 6 | Bit 5 | Bit 4 | Bit 3 | Bit 2 | Bit 1 |
|---|---|---|---|---|---|---|---|
| MICO indication information elements | | | | T_dl_2 | T_dl_1 | 1 | 1 |

COMMUNICATION METHOD OF NETWORK ENTITY AND RELATED WIRELESS COMMUNICATION SYSTEM

BACKGROUND OF THE INVENTION

1. Field of the Invention

The present invention relates to a communication method of a network entity and a related wireless communication system, and more particularly, to a communication method of a network entity and a related wireless communication system for user equipment (UE) in a mobile initiated connection only (MICO) mode.

2. Description of the Prior Art

Conventional wireless communication systems provide communication services, e.g. transmission of audio, video, data and messages. The wireless communication system may include multiple base stations (BS) where each of the base stations may support communications of multiple user equipment (UE). Base stations may communicate with user equipment via $5^{th}$ generation (5G) wireless systems.

In order to apply communication techniques in different regions, the 5G new radio (NR) access standard proposes a mobile initiated connection only (MICO) mode, which enables a UE to ignore messages from a network side when the UE enters the MICO mode and in an idle mode, wherein the UE may be an internet of things (IOT) equipment with low-mobility and power-saving type. When, however, the UE is in the MICO mode, timing of incoming data or messages is not predictable, and may be missed from the network side or other UEs. Therefore, improvements are necessary to the prior art.

SUMMARY OF THE INVENTION

The present invention provides a communication method of a network entity and a related wireless communication system which can avoid missing messages from a network side or other user equipment when a user equipment is in a MICO mode, thereby achieving a power saving effect.

An embodiment of the present invention discloses a communication method of a network entity for a network equipment, comprising: receiving a request message of entering a mobile initiated connection only (MICO) mode from a user equipment (UE); determining a time length of a delay timer of the MICO mode according to the request message; and paging the UE when the delay timer of the MICO expires.

Another embodiment of the present invention discloses a communication method of a network entity for a user equipment (UE), comprising: triggering a request message of entering a mobile initiated connection only (MICO) mode; receiving a time length of a delay timer determined by a network equipment; and waking the UE to receive a paging from the network equipment when the delay timer of the MICO mode expires.

Another embodiment of the present invention discloses a wireless communication system, comprising: at least a user equipment (UE), configured to trigger a request message of entering a mobile initiated connection only (MICO) mode; a network equipment, configured to determine a time length of a delay timer of the MICO mode of the UE according to the request message, and transmit a registration accept message or a user equipment configuration update message to the UE, the message including the time length of the delay timer of the UE in the MICO mode; wherein the UE accepts a paging from the network equipment when the delay timer of the MICO mode expires.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
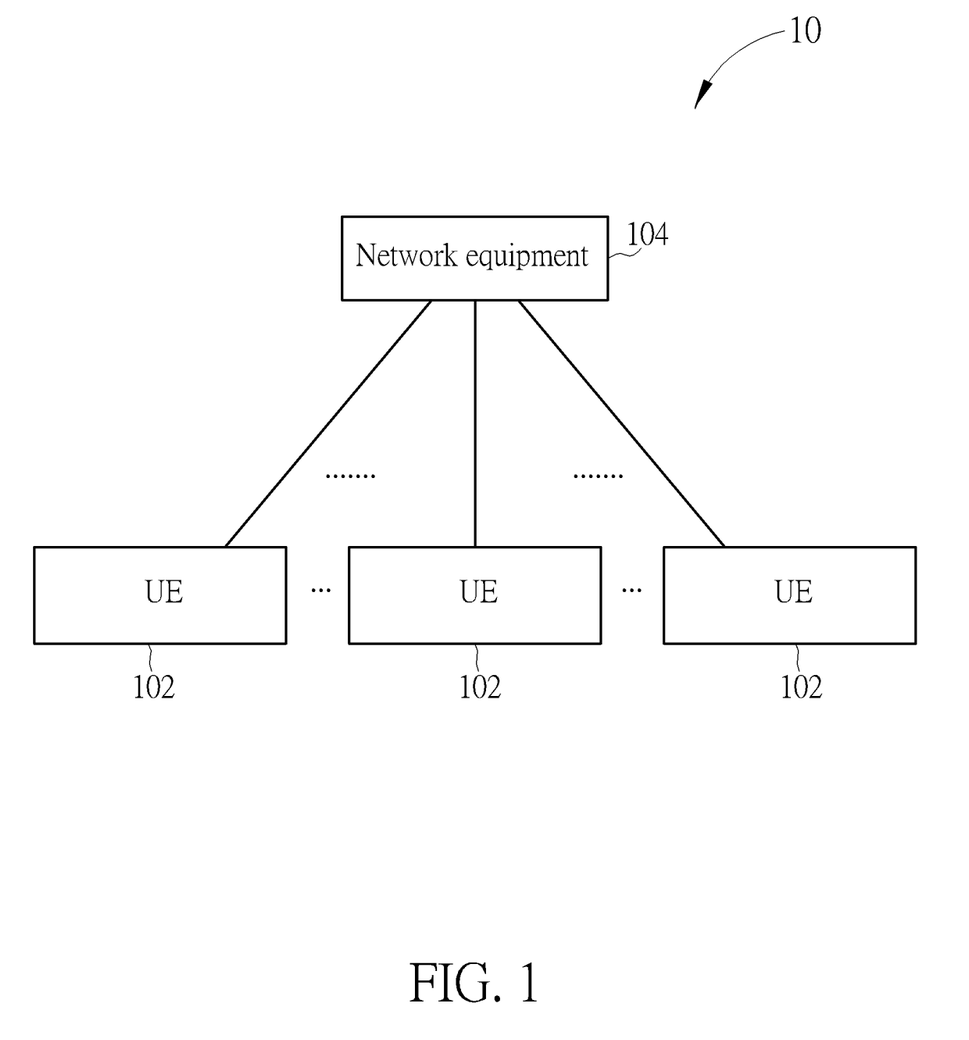
FIG. 1 is a schematic diagram of a wireless communication system according to an embodiment of the present invention.

Refer to FIG. 1, which is a schematic diagram of a wireless communication system 10 according to an embodiment of the present invention. The wireless communication system 10 includes at least a user equipment (UE) 102 and a network equipment 104. In FIG. 1, the UE 102 and network equipment 104 are illustrated for briefly describing a structure of the wireless communication system 10. In practice, a wireless network of the wireless communication system 10 may include multiple nodes B of a UMTS Terrestrial Radio Access Network (UTRAN) or multiple nodes B of a $5^{th}$ generation (5G) wireless system. The UE 102 may be an internet of things (IOT) equipment with low-mobility and of a power-saving type. The network equipment 104 may be a core network equipment of a 5G network, a Long Term Evolution (LTE) system or other wireless communication systems, which may include an access and management function (AMF) entity, a session management function (SMF) entity and a user plane function (UPF) entity. In an embodiment, the AMF entity of the network equipment 104 may be utilized for managing the access and mobility of the UE and performing authentication, handover, and location update of the UE; the SMF entity may be utilized for managing sessions, e.g. establishing, modifying or releasing packet data units (PDU) sessions; and the UPF entity may be utilized for forwarding data of the UE.

In conventional 5G New Radio (NR) standards, the UE cannot know timings to wake up for receiving data or messages when in a mobile initiated connection only (MICO) mode, and thus messages from the network equipment or other UEs (e.g. downlink data, packets or messages) may be missed. Therefore, a timer mechanism of the wireless communication system 10 according to an embodiment of the present invention enables the UE 102 to download the data in a period allowed by the network equipment 104, such that an amount of missing downlink data, packets or messages are reduced.

Figure 2:
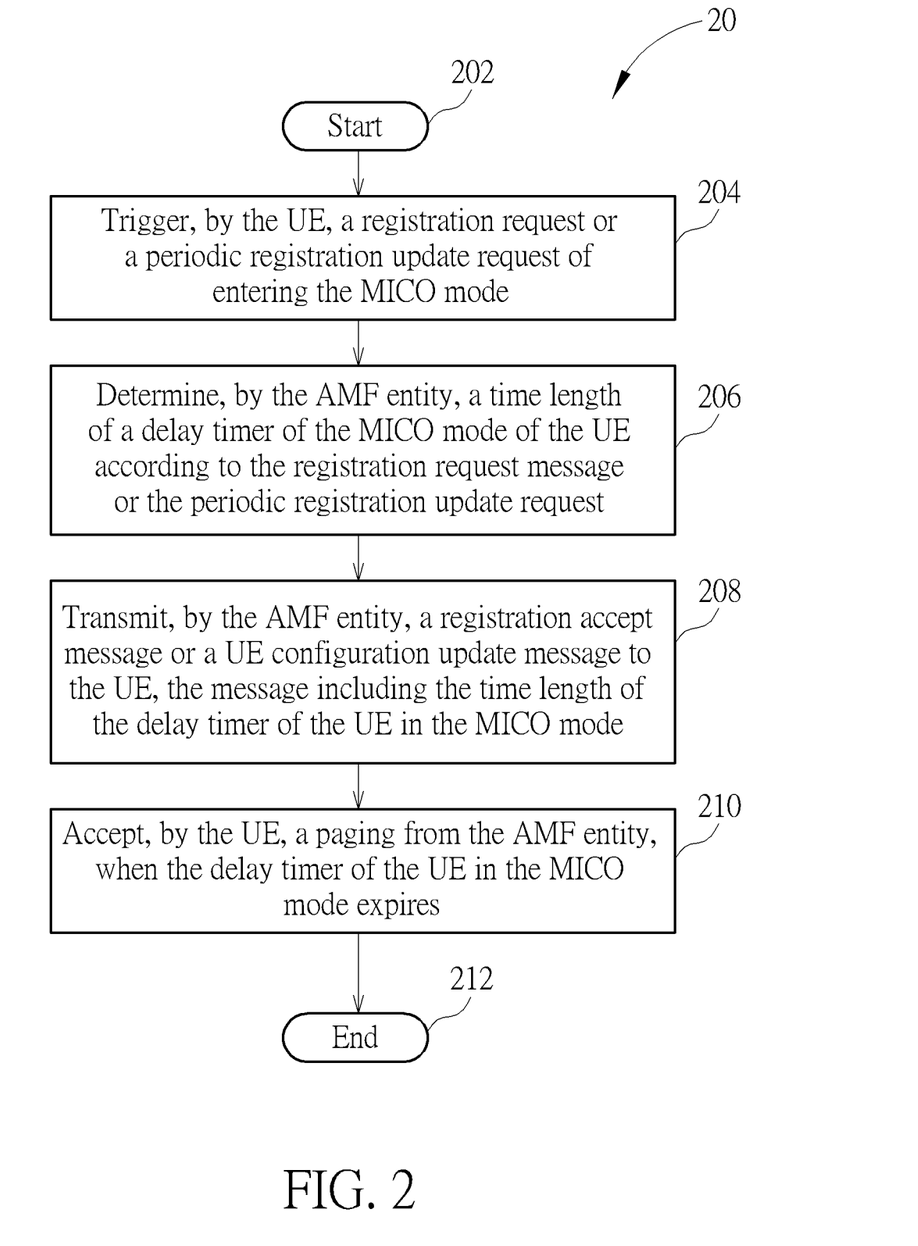
FIG. 2 is a schematic diagram of a communication method of a network entity according to an embodiment of the present invention.

Refer to FIG. 2, which is a schematic diagram of a communication method 20 of the network entity according to an embodiment of the present invention. The communication method 20 may be utilized in the wireless communication system 10 and includes the following steps:

Step 202: Start.

Step 204: Trigger, by the UE 102, a registration request or a periodic registration update request of entering the MICO mode.

Step 206: Determine, by the AMF entity, a time length of a delay timer of the MICO mode of the UE 102 according to the registration request message or the periodic registration update request.

Step 208: Transmit, by the AMF entity, a registration accept message or a UE configuration update message to the UE 102, the message including the time length of the delay timer of the UE 102 in the MICO mode.

Step 210: Accept, by the UE 102, a paging from the AMF entity, when the delay timer of the UE 102 in the MICO mode expires.

Step 212: End.

According to the communication method 20, in step 204, the UE 102 triggers the registration request message or the periodic registration update request of entering the MICO mode. The registration request message or the periodic registration update request includes an MICO indication. When the UE 102 transmits the registration request message or the periodic registration update request to the AMF entity, the MICO indication is carried with the registration request message or the periodic registration update request.

Figure 3:
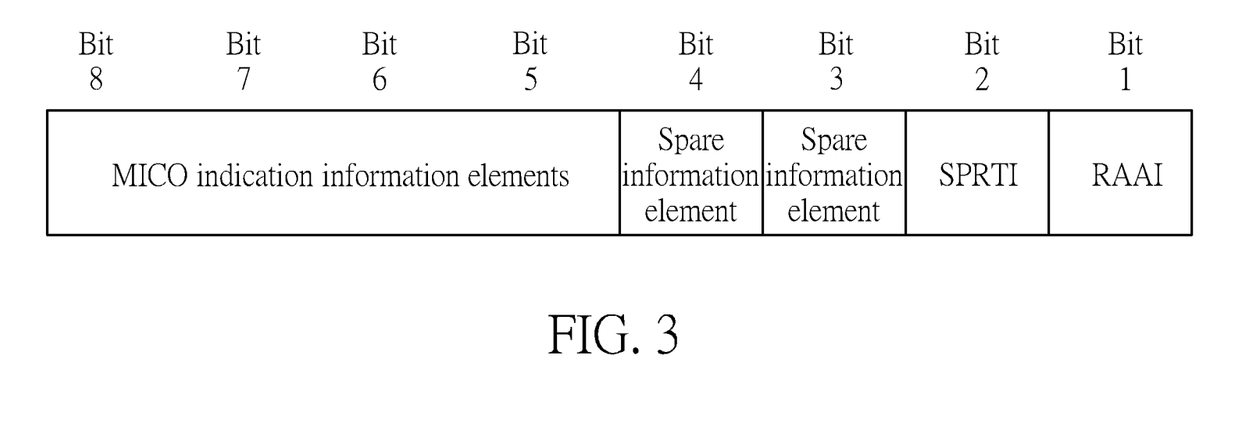
FIG. 3 is a schematic diagram of a mobile initiated connection only indication according to an embodiment of the present invention.

The MICO indication defined by the 3$^{rd}$ Generation Partnership Project (3GPP) is shown in FIG. 3: in an eight-bit MICO indication, bit 1 of the network equipment 104 is defined as a registration area allocation indication (RAAI); bit 2 of the network equipment 104 is defined as a strictly periodic registration timer indication (SPRTI), bits 3 and 4 are defined as spare information elements; and bits 5-8 are defined as the MICO indication information elements.

Figure 4:
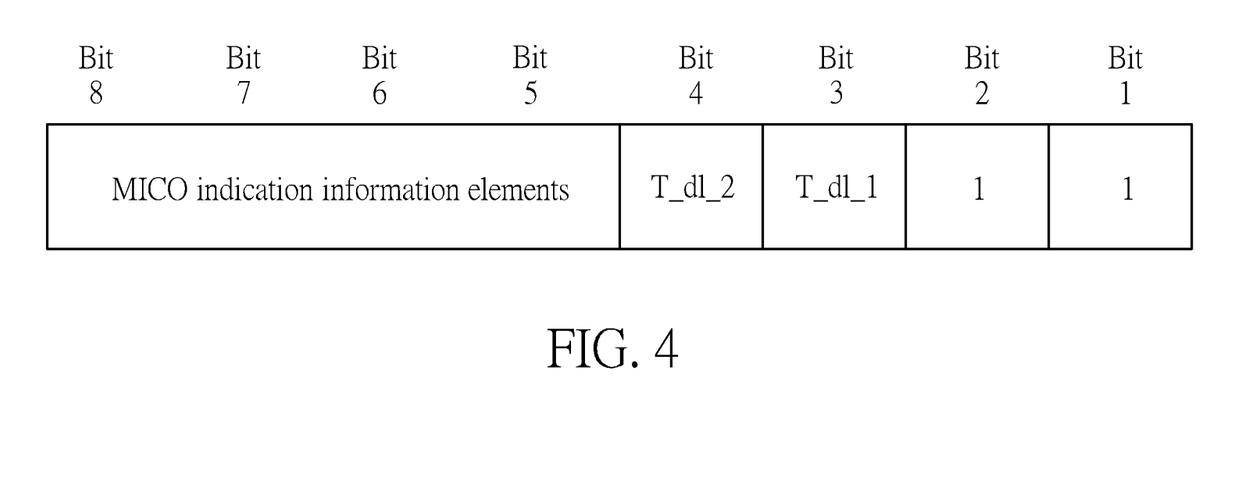
FIG. 4 and FIG. 5 are schematic diagrams of a mobile initiated connection only indication according to an embodiment of the present invention.

In a scenario from the UE 102 to the network equipment 104, the MICO indication is shown in FIG. 4: bit 1 represents that a preference value of the registration request message transmitted by the UE 102 in the MICO mode is 1; bit 2 represents that the UE 102 supports a timer T3512; and T_d1_1, T_d1_2 in bits 3 and 4 represent an expected delay time length of the download of the UE 102.

Figure 5:
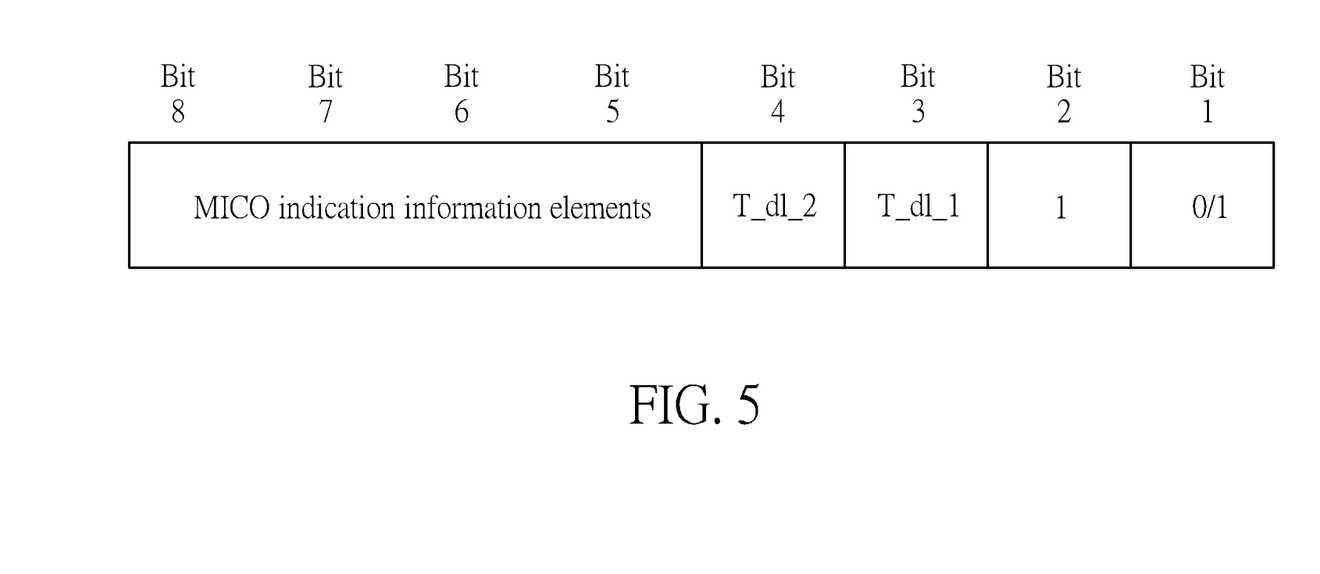

In the scenario from the network equipment 104 to the UE 102, the MICO indication is shown in FIG. 5: bit 2 represents that the network equipment 104 supports the timer T3512; and T_d1_1, T_d1_2 in bits 3 and 4 represent that the network equipment 104 allows the delay time length proposed by the UE 102.

The T_d1_1, T_d1_2 of bits 3 and 4 in the MICO indication represent the time length for delaying the download, which may be binary bits corresponding to the time length. For example, when the T_d1_1, T_d1_2 are all 0, the time length of the delay timer is 0 hours; when the T_d1_1 is 1, T_d1_2 is 0, the time length of the delay timer is 1 hour; when the T_d1_1 is 0, T_d1_2 is 1, the time length of the delay timer is 2 hours; when both T_d1_1 and T_d1_2 are 1, the time length of the delay timer is 3 hours. In other words, a maximum delay time length of the UE 102 for downloading is 3 hours in this embodiment. Notably, the time length of the delay timer corresponding to the T_d1_1, T_d1_2 is not limited to the above embodiments, and other examples are all within the scope of the present invention.

In step 206, the AMF entity determines the time length of the delay timer of the UE 102 in the MICO mode according to the registration request message or the periodic registration update request from the UE 102. Then, in step 208, the AMF entity transmits the registration accept message or the UE configuration update message to the UE 102, the message including the time length of the delay timer of the UE 102 in the MICO mode. The AMF entity determines the time length of the delay timer of the UE 102 in the MICO mode in step 206, such that the corresponding MICO indication is transmitted to the UE 102 in step 208.

When the UE 102 receives the time length of the delay timer determined from the AMF entity, the UE 102 checks the registration accept message or the UE configuration update message to determine whether the AMF entity allows the UE 102 to enter the MICO mode or not. In an embodiment, when the registration accept message or the UE configuration update message received by the UE 102 carries the MICO indication, the AMF entity allows the UE 102 to enter the MICO mode. In contrast, when the registration accept message or the UE configuration update message received by the UE 102 does not carry the MICO indication, the AMF entity does not allow the UE 102 to enter the MICO mode. Notably, in an example, when the registration accept message or the UE configuration update message transmitted by the AMF entity carries the MICO indication, and bits 3 and 4 of the MICO indication are 0, the network equipment 104 allows the UE 102 to enter the MICO mode, but setting the time length of the delay timer is not allowed.

Therefore, when the AMF entity allows the UE 102 to enter the MICO mode, the delay timer of the UE 102 and the AMF entity are triggered to count down at the same time. Meanwhile, the AMF entity determines a period of the UE 102 of downloading downlink data according to the time length of the delay timer and notifies other network entities (i.e. the SMF entity and the UPF entity) and other UEs about a status (e.g. whether the UE 102 is in the MICO mode or a wake-up time) of the UE.

Then, in step 210, when the delay timer of the UE 102 in the MICO mode expires, the UE 102 accepts the paging from the AMF entity. In addition, since the network equipment 104 knows that the delay timer expires, other network entities (i.e. the SMF entity and the UPF entity) may trigger a service request procedure to transmit the downlink data to the UE 102. The UE 102 enters an idle mode after the UE 102 receives the downlink data, waits for the next expiration of the timer T3512, and triggers the periodic registration update request to repeat the steps in the communication method 20 of the network entity.

Therefore, the UE 102 according to an embodiment of the present invention is awakened to receive the downlink data from the network equipment 104 based on the time length of the delay timer. Since the delay timer of the UE 102 is synchronized with that of the network equipment 104, a download timing of the UE 102 is synchronized with the downlink data, such that circumstances of missing packets, data or messages are avoided, and signaling between the UE 102 and the network equipment for executing download procedures are reduced to achieve the power-saving effect.

Figure 6:
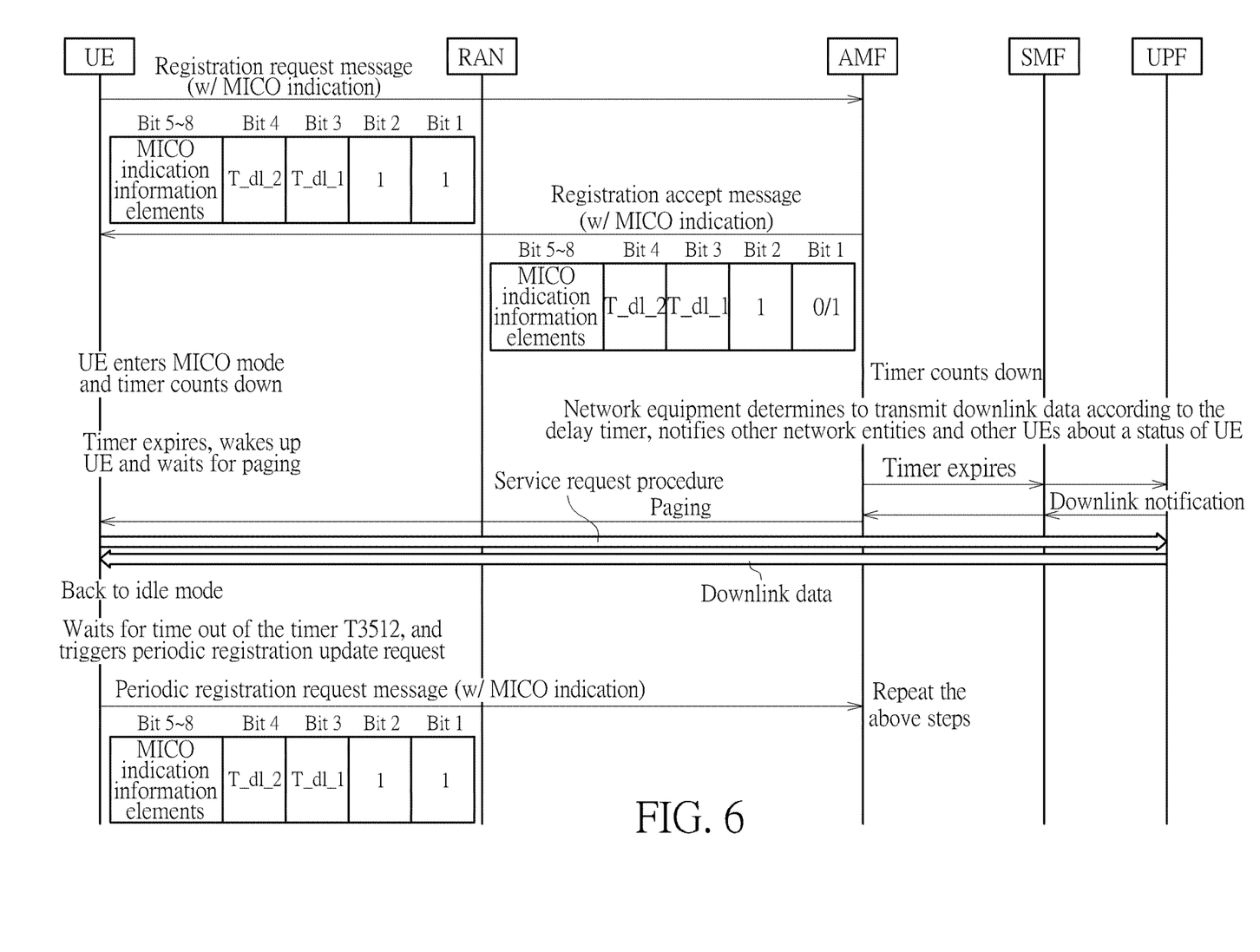
FIG. 6 is a schematic diagram of a user equipment triggering a request of entering a mobile initiated connection only (MICO) mode to a network equipment according to an embodiment of the present invention.

The above communication method of the UE 102 proposing the request to the network equipment 104 for entering the MICO mode may be summarized by the flowchart shown in FIG. 6. Further details of operations are provided in the communication method 20 of the network entity and therefore not narrated here for brevity.

In summary, the communication method of a network entity and a related wireless communication system according to an embodiment of the present invention synchronizes the download timing of the UE and the network equipment via a timer mechanism, which can prevent missing packets, data or messages, such that signaling between the UE and the network equipment are reduced, thereby achieving a power-saving effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method of a network entity for a network equipment, comprising:
   receiving a request message of entering a mobile initiated connection only (MICO) mode from a user equipment (UE);
   determining a time length of a delay timer of the MICO mode according to the request message to adjust the delay timer of the MICO mode;
   paging the UE in response to an expiry of the delay timer of the MICO mode;
   triggering a service request procedure to transmit downlink data after the UE accepts the paging;
   in response to allowing the UE to enter the MICO mode by the network equipment, simultaneously triggering the delay timer of the MICO mode and a delay timer of the network equipment to count down;
   determining a period of the UE of downloading downlink data according to the delay timer and notifying other network entities of the network equipment and/or other user equipment about a status of the UE; and
   in response to allowing the UE to enter the MICO mode, transmitting a registration accept message or a user equipment configuration update message including a mobile initiated connection only indication;
   wherein the other network entities include at least one of a session management function (SMF) entity and a user plane function (UPF) entity.

2. The communication method of a network entity of claim 1, wherein the request message includes a registration request message or a periodic registration update request.

3. The communication method of a network entity of claim 1, wherein the delay timer of the network equipment is of an access and management function (AMF) entity of the network equipment.

4. The communication method of a network entity of claim 1, further comprising:
   triggering a service request procedure by the other network entities when the delay timer of the network equipment expires, and transmitting the downlink data to the UE.

5. The communication method of a network entity of claim 1, wherein the mobile initiated connection only indication includes at least a spare bit to indicate the time length of the delay timer.

6. A communication method of a network entity for a user equipment (UE), comprising:
   triggering a request message of entering a mobile initiated connection only (MICO) mode;
   receiving a time length of a delay timer determined by a network equipment to adjust the delay timer of the MICO mode;
   waking the UE to receive a paging from the network equipment in response to an expiry of the delay timer of the MICO mode expires; and
   in response to allowing the UE to enter the MICO mode by the network equipment, simultaneously triggering the delay timer of the MICO mode and a delay timer of the network equipment to count down;
   checking a registration accept message or a user equipment configuration update message from the network equipment; and
   determining whether the UE is allowed to enter the MICO mode by the network equipment;
   entering the MICO mode when the received registration accept message or the received UE configuration update message includes a mobile initiated connection only indication.

7. The communication method of a network entity of claim 6, wherein the mobile initiated connection only indication includes at least a spare bit to indicate the time length of the delay timer.

8. A wireless communication system, comprising:
   at least a user equipment (UE) that transmits a request message of entering a mobile initiated connection only (MICO) mode; and
   a network equipment that determines a time length of a delay timer of the MICO mode of the UE according to the request message to adjust the delay timer of the MICO mode, and to transmit a registration accept message or a user equipment configuration update message to the UE, the message including the time length of the delay timer of the UE in the MICO mode, and to simultaneously trigger the delay timer of the MICO mode and a delay timer of the network equipment to count down in response to allowing the UE to enter the MICO mode by the network equipment;
   wherein the UE accepts a paging from the network equipment in response to an expiry of the delay timer of the MICO mode;
   wherein the network equipment is configured to trigger a service request procedure to transmit downlink data after the UE accepts the paging;
   wherein the registration request message or the periodic registration update request includes a mobile initiated connection only indication;
   wherein the delay timer is of an access and management function (AMF) entity of the network equipment, and the UE is configured to check the registration accept message or a user equipment configuration update message to determine whether the AMF entity allows the UE to enter the MICO mode or not; and the delay timer of the UE and the AMF entity are simultaneously triggered to count down when the AMF entity allows the UE to enter the MICO mode;
   wherein the AMF entity determines a period of the UE of downloading downlink data according to the delay timer and notifies other network entities of the network equipment and/or other user equipment about a status of the UE;
   wherein the other network entities include at least one of a session management function (SMF) entity and a user plane function (UPF) entity;
   wherein when the UE receives the registration accept message or the user equipment configuration update message which includes a mobile initiated connection only indication from the AMF entity, the AMF entity allows the UE to enter the MICO mode.

9. The wireless communication system of claim 8, wherein the request message includes a registration request message or a periodic registration update request.

10. The wireless communication system of claim 8, wherein the mobile initiated connection only indication includes at least a spare bit to indicate the time length of the delay timer.

11. A communication method of a network entity for a network equipment, comprising:
   receiving a request message of entering a mobile initiated connection only (MICO) mode from a user equipment (UE);
   determining a time length of a delay timer of the MICO mode according to the request message to adjust the delay timer of the MICO mode;
   paging the UE in response to an expiry of the delay timer of the MICO mode;
   triggering a service request procedure to transmit downlink data after the UE accepts the paging;
   in response to allowing the UE to enter the MICO mode by the network equipment, simultaneously triggering the delay timer of the MICO mode and a delay timer of the network equipment to count down;
   determining a period of the UE of downloading downlink data according to the delay timer and notifying other network entities of the network equipment and/or other user equipment about a status of the UE; and
   in response to not allowing the UE to enter the MICO mode, transmitting the registration accept message or a user equipment configuration update message without the mobile initiated connection only indication;
   wherein the other network entities include at least one of a session management function (SMF) entity and a user plane function (UPF) entity.

12. A communication method of a network entity for a user equipment (UE), comprising:
   triggering a request message of entering a mobile initiated connection only (MICO) mode;
   receiving a time length of a delay timer determined by a network equipment to adjust the delay timer of the MICO mode;
   waking the UE to receive a paging from the network equipment in response to an expiry of the delay timer of the MICO mode expires; and
   in response to allowing the UE to enter the MICO mode by the network equipment, simultaneously triggering the delay timer of the MICO mode and a delay timer of the network equipment to count down;
   checking a registration accept message or a user equipment configuration update message from the network equipment;
   determining whether the UE is allowed to enter the MICO mode by the network equipment; and
   not entering the MICO mode when the received registration accept message or the received UE configuration update message does not include the mobile initiated connection only indication.

13. A wireless communication system, comprising:
   at least a user equipment (UE) that transmits a request message of entering a mobile initiated connection only (MICO) mode; and
   a network equipment that determines a time length of a delay timer of the MICO mode of the UE according to the request message to adjust the delay timer of the MICO mode, and to transmit a registration accept message or a user equipment configuration update message to the UE, the message including the time length of the delay timer of the UE in the MICO mode, and to simultaneously trigger the delay timer of the MICO mode and a delay timer of the network equipment to count down in response to allowing the UE to enter the MICO mode by the network equipment;
   wherein the UE accepts a paging from the network equipment in response to an expiry of the delay timer of the MICO mode;
   wherein the network equipment is configured to trigger a service request procedure to transmit downlink data after the UE accepts the paging;
   wherein the registration request message or the periodic registration update request includes a mobile initiated connection only indication;
   wherein the delay timer is of an access and management function (AMF) entity of the network equipment, and the UE is configured to check the registration accept message or a user equipment configuration update message to determine whether the AMF entity allows the UE to enter the MICO mode or not; and the delay timer of the UE and the AMF entity are simultaneously triggered to count down when the AMF entity allows the UE to enter the MICO mode;
   wherein the AMF entity determines a period of the UE of downloading downlink data according to the delay timer and notifies other network entities of the network equipment and/or other user equipment about a status of the UE;
   wherein the other network entities include at least one of a session management function (SMF) entity and a user plane function (UPF) entity;
   wherein when the UE receives the registration accept message or the user equipment configuration update message which does not include a mobile initiated connection only indication from the AMF entity, the AMF entity does not allow the UE to enter the MICO mode.

* * * * *